US011995940B2

(12) United States Patent
Saji

(10) Patent No.: US 11,995,940 B2
(45) Date of Patent: May 28, 2024

(54) BANKNOTE HANDLING APPARATUS, CONVEYANCE CONTROL METHOD, AND NON-TRANSITORY COMPUTER-READABLE RECORDING MEDIUM

(71) Applicant: FUJITSU FRONTECH LIMITED, Inagi (JP)

(72) Inventor: Toshiki Saji, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 64 days.

(21) Appl. No.: 17/837,258

(22) Filed: Jun. 10, 2022

(65) Prior Publication Data

US 2022/0301382 A1 Sep. 22, 2022

Related U.S. Application Data

(63) Continuation of application No. PCT/JP2019/051037, filed on Dec. 25, 2019.

(51) Int. Cl.

*G07D 11/16* (2019.01)
*G07D 11/18* (2019.01)
*G07D 11/30* (2019.01)
*G07D 11/50* (2019.01)

(52) U.S. Cl.

CPC ............. *G07D 11/50* (2019.01); *G07D 11/18* (2019.01); *G07D 11/30* (2019.01); *G07D 2211/00* (2013.01)

(58) Field of Classification Search

CPC ......... G07D 11/16; G07D 11/18; G07D 11/50
USPC .......................................................... 235/379
See application file for complete search history.

(56) References Cited

U.S. PATENT DOCUMENTS

2019/0284002 A1 9/2019 Kitauchi et al.

FOREIGN PATENT DOCUMENTS

| | | | |
|---|---|---|---|
| JP | S62-79159 A | | 4/1987 |
| JP | 2014-232446 A | | 12/2014 |
| JP | 2015-158730 A | | 9/2015 |
| JP | 2018-045265 A | | 3/2018 |
| JP | 2018-144989 A | | 9/2018 |
| JP | 2019-021163 A | | 2/2019 |
| WO | WO 2011/092824 A1 | | 8/2011 |

OTHER PUBLICATIONS

International Search Report (Form PCT/ISA/210); dated Mar. 17, 2020 in corresponding PCT Application No. PCT/JP2019/051037 (3 pages) (2 pages English Translation).

(Continued)

*Primary Examiner* — Toan C Ly
(74) *Attorney, Agent, or Firm* — STAAS & HALSEY LLP

(57) ABSTRACT

A banknote handling apparatus includes a plurality of storage mechanisms that are provided for each type of paper sheet and store a corresponding paper sheet, a distinguishing unit that distinguishes a first paper sheet input, a detection unit that detects that the first paper sheet is conveyed to a corresponding storage mechanism specified according to a result of distinguishing, and a drive control unit that controls driving of a gate portion that switches a conveyance pathway to the corresponding storage mechanism according to a positional relationship between the first paper sheet and a forward paper sheet conveyed earlier than the first paper sheet when conveyance of the first paper sheet is detected.

6 Claims, 12 Drawing Sheets

(56) References Cited

OTHER PUBLICATIONS

Extended European Search Report dated Nov. 30, 2022 in corresponding European Patent Application No. 19957075.5 (7 pages).
Chinese Office Action issued in counterpart Chinese Application No. 201980103055.6 dated Dec. 4, 2023.

| BANKNOTE | CASSETTE |
|---|---|
| 10,000 YEN BILL | CASSETTE A1, CASSETTE A2 |
| 5,000 YEN BILL | CASSETTE B1, CASSETTE B2 |
| 1,000 YEN BILL | CASSETTE C1, CASSETTE C2 |
| OTHER | CASSETTE D |

FIG.7

| BANKNOTE SIZE [mm] | CONVEYANCE SPEED [mm/sec] | COUNTING SPEED [SHEET/sec] | ARRIVAL TIME OF NEXT BANKNOTE [msec] | TIME TAKEN TO PASS THROUGH SENSOR [msec] | BANKNOTE INTERVAL [msec] | GATE PORTION DRIVE START TIME [msec] |
|---|---|---|---|---|---|---|
| 65 | 1200 | 8 | 125.00 | 54 | 71 | 300 |
| | 1600 | 10 | 100.00 | 40 | 60 | 280 |
| 70 | 1200 | 8 | 125.00 | 58 | 67 | 250 |
| | 1600 | 10 | 100.00 | 43 | 57 | 220 |
| 75 | 1200 | 8 | 125.00 | 62 | 63 | 200 |
| | 1600 | 10 | 100.00 | 46 | 54 | 180 |
| 80 | 1200 | 8 | 125.00 | 66 | 59 | 160 |
| | 1600 | 10 | 100.00 | 50 | 50 | 140 |

| BANKNOTE SIZE [mm] | CONVEYANCE SPEED [mm/sec] | COUNTING SPEED [SHEET/sec] | ARRIVAL TIME OF NEXT BANKNOTE [msec] | TIME TAKEN TO PASS THROUGH SENSOR [msec] | BANKNOTE INTERVAL [msec] | GATE PORTION DRIVE START TIME [msec] |
|---|---|---|---|---|---|---|
| 75 | 1200 | 8 | 125.00 | 62 | 63 | 200 |

BANKNOTE HANDLING APPARATUS, CONVEYANCE CONTROL METHOD, AND NON-TRANSITORY COMPUTER-READABLE RECORDING MEDIUM

CROSS-REFERENCE TO RELATED APPLICATION

This application is a continuation application of International Application PCT/JP2019/051037, filed on Dec. 25, 2019, and designating the U.S., the entire contents of which are incorporated herein by reference.

FIELD

The present invention relates to a banknote handling apparatus, a conveyance control method, and a conveyance control program.

BACKGROUND

A banknote handling apparatus that handles banknotes such as an automated teller machine (ATM), a cash dispenser (CD), and a teller cash recycler (TCR) installed in a bank or the like, or a deposit/withdrawal machine installed in a back office or the like of a store is known. Such a banknote handling apparatus switches a conveyance destination such that the banknotes are contained in different cassettes for each denomination and state.

Such a banknote handling apparatus includes a deposit/withdrawal unit that deposits and withdraws paper sheets such as banknotes, a temporary storage that temporarily stores the deposited paper sheets, and a plurality of cassettes that serve as storage provided for each type of paper sheets. For example, the banknote handling apparatus executes distinguishing on the banknote deposited from the deposit/withdrawal unit, and stores the banknote in the temporary storage via a conveyance path. Subsequently, a banknote handling apparatus feeds a banknote from a temporary storage, executes distinguishing, drives a gate portion that switches a conveyance path to a cassette corresponding to the banknote according to the result of distinguishing, and conveys and stores the banknote to an appropriate cassette.

Patent Literature 1: JP 2015-158730 A

Patent Literature 2: JP 2018-144989 A

Patent Literature 3: JP 2014-232446 A

Patent Literature 4: JP 2019-21163 A

However, in the technique described above, in a case where detection of a banknote to be conveyed is delayed, gate switching to the conveyance destination cassette is not in time, and a conveyance error can occur.

In general, the gate portion is set to be driven after a predetermined time has elapsed since an optical sensor has detected the leading end of the banknote. However, for example, in a case where a banknote subjected to polymer treatment (hereinafter, it may be simply referred to as a "polymer banknote") having a clear window, a damaged banknote, a banknote having a direction different from the normal direction, or the like is conveyed, there is a possibility that the optical sensor is not capable of normally detecting the leading end of the banknote and detects the banknote at a position located on an inner side from the leading end of the banknote. In this case, the timing of driving the gate portion is delayed by the time over which the banknote passes to the inner side from the leading end.

Therefore, the gate portion is not driven in time, and a failure such as collision of the banknote with the gate portion occurs.

SUMMARY

According to an aspect of an embodiment, a banknote handling apparatus includes: a plurality of storage mechanisms that are provided for each type of paper sheet and store a corresponding paper sheet; a distinguishing unit that distinguishes a first paper sheet input; a detection unit that detects that the first paper sheet is conveyed to a corresponding storage mechanism specified according to a result of distinguishing; and a drive control unit that controls driving of a gate portion that switches a conveyance pathway to the corresponding storage mechanism according to a positional relationship between the first paper sheet and a forward paper sheet conveyed earlier than the first paper sheet when conveyance of the first paper sheet is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of reference data.

DESCRIPTION OF EMBODIMENTS

Hereinafter, examples of the banknote handling apparatus, the conveyance control method, and the conveyance control program according to the present invention will be described in detail on the basis of the drawings. Note that this invention is not limited by the examples. In addition, the examples can be appropriately combined within a range without inconsistency.

First Example

Overall Configuration

Figure 1:
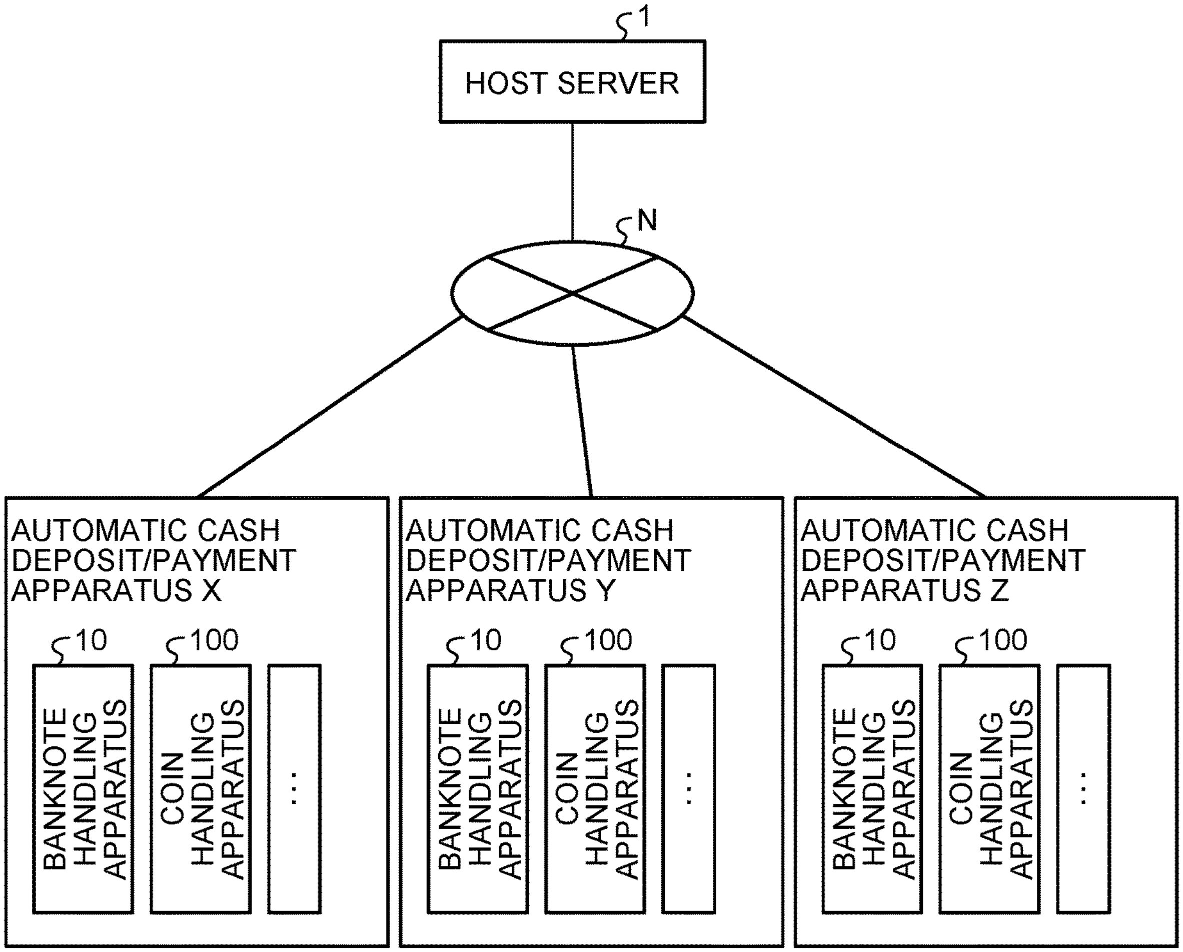
FIG. 1 is a diagram illustrating an overall configuration example of a system according to a first example.

FIG. 1 is a diagram illustrating an overall configuration example of a system according to the first example. As illustrated in FIG. 1, this system is a deposit/withdrawal system including a host server 1 and a plurality of automatic cash deposit/payment apparatuses including an automatic cash deposit/payment apparatus X, an automatic cash deposit/payment apparatus Y, and an automatic cash deposit/payment apparatus Z. Note that, in the first example, description will be made by taking Japanese yen as an example, but other banknotes such as dollar bills and paper sheets of voting ticket and securities such as stock certificates can be processed in a similar manner.

In addition, the host server and each automatic cash deposit/payment apparatus are communicably connected to each other via a network N. Note that various communication networks such as a dedicated line and the Internet can be adopted as the network N.

Each automatic cash deposit/payment apparatus includes a plurality of units such as a banknote handling apparatus 10 and a coin handling apparatus, and is an apparatus that processes deposit from a user and withdrawal to the user. The banknote handling apparatus 10 is an apparatus that stores a banknote deposited from the user in the cassette, which is an example of storage, and conveys and withdraws a banknote instructed to be withdrawn by the user from the cassette. A coin handling apparatus 100 is an apparatus that stores a coin deposited from the user in the cassette and conveys and withdraws a coin instructed to be withdrawn by the user from the cassette.

Description of the Banknote Handling Apparatus

Figure 2:
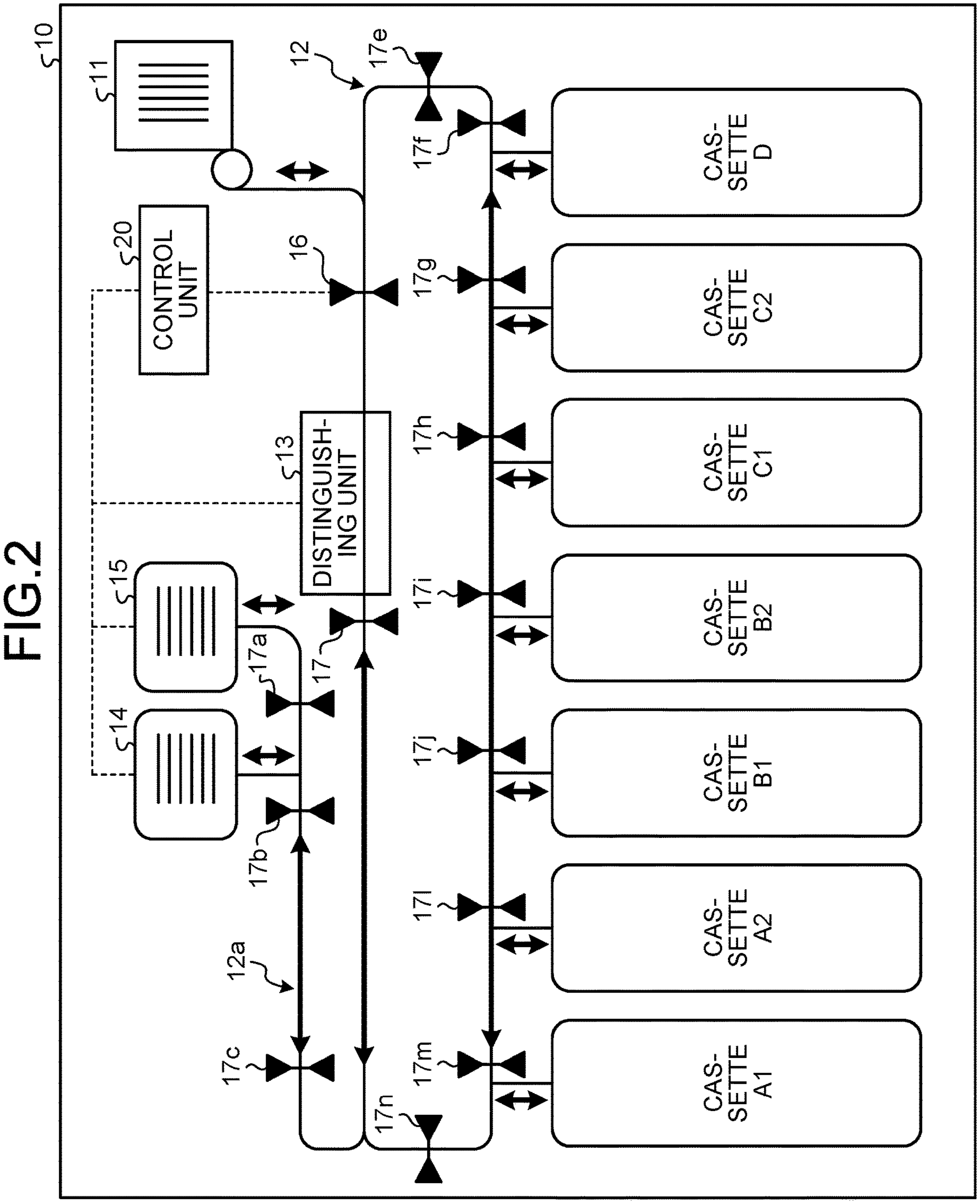
FIG. 2 is a diagram explaining a banknote handling apparatus according to the first example.

Next, the banknote handling apparatus 10 will be described. FIG. 2 is a diagram explaining the banknote handling apparatus 10 according to the first example. The banknote handling apparatus 10 includes a deposit/withdrawal unit 11, a conveying mechanism 12, a distinguishing unit 13, a temporary storage 14, a damaged banknote temporary storage 15, a reference sensor 16, passage sensors 17*a* to 17*n*, a cassette A1, a cassette A2, a cassette B1, a cassette B2, a cassette C1, a cassette C2, a cassette D, and a control unit 20. Note that each unit described here is merely an example, and may include, for example, a functional unit such as a touch panel or another control mechanism in addition to these.

The deposit/withdrawal unit 11 is an input/output unit that processes the deposit/withdrawal of the banknote according to a banknote deposit/withdrawal transaction operation by the user. The conveying mechanism 12 is a driving unit that drives a roller, a motor, or the like, which is not illustrated, to convey the banknote in the banknote handling apparatus 10 via a conveyance path 12*a*. For example, the conveying mechanism 12 conveys the banknote deposited in the deposit/withdrawal unit 11 to the temporary storage 14 or the damaged banknote temporary storage 15, and conveys the banknote from the temporary storage 14 or the damaged banknote temporary storage 15 to each cassette.

The distinguishing unit 13 is a processing unit or a processing mechanism that executes various kinds of distinguishing such as the type of banknote, whether the banknote is genuine or counterfeit, and the degree of damage of the banknote. For example, the distinguishing unit 13 is installed on the conveyance path 12*a* between the deposit/withdrawal unit 11 and each of the temporary storages 14 and 15, and executes distinguishing of each deposited banknote. In addition, the distinguishing unit 13 also executes distinguishing of each banknote conveyed from each of the temporary storages 14 and 15 to each cassette.

The temporary storage 14 is a storage that temporarily stores (holds) each deposited banknote before storage in the corresponding cassette. For example, the temporary storage 14 stores normal banknotes among the deposited banknotes in the order of distinguishing by the distinguishing unit 13. Note that the temporary storage 14 can store, for example, 300 sheets.

The damaged banknote temporary storage 15 is a storage that temporarily stores (holds) a damaged banknote that is not normal among the deposited banknotes before storage in the corresponding cassette. For example, the damaged banknote temporary storage 15 stores the banknote corresponding to the damaged banknote distinguished as a deteriorated banknote by the distinguishing unit 13 among the deposited banknotes in the order of distinguishing. Note that the damaged banknote temporary storage 15 can store, for example, 300 sheets.

The reference sensor 16 is a sensor for executing driving or switching of a gate portion for switching a conveyance pathway to each cassette. Specifically, the reference sensor 16 includes two optical sensors, and outputs a detection signal to the control unit 20 when at least one of the optical sensors detects a banknote conveyed on the conveyance path 12*a*. Note that the reference sensor 16 is positioned between the deposit/withdrawal unit 11 and the distinguishing unit 13, and is installed on the conveyance path 12*a* between the distinguishing unit 13 and each cassette. Note that the position of the reference sensor 16 is an example, and is not limited thereto, and can be arranged at an arbitrary position depending on the positional relationship of main parts in the apparatus.

Each of the passage sensors 17*a* to 17*n* is a sensor that is installed on the conveyance path 12*a* and outputs a detection signal to the control unit 20 when detecting the conveyance of the banknote. For example, each passage sensor is installed in the vicinity of the connections that connect each of the distinguishing unit 13, the temporary storage 14, the damaged banknote temporary storage 15, and the cassettes with the conveyance path 12*a* on the conveyance path 12*a* on which the banknote is conveyed. In this manner, it is possible to specify the conveyance status of the banknote and whether the banknote has been conveyed to the conveyance destination by the detection by each of the passage sensors 17.

The cassette A1 and the cassette A2 are storages for storing 10,000 yen bills (hereinafter, it may be simply described as "10,000 yen"). In addition, at the entrance of each cassette, the gate portion for switching the conveyance pathway is installed in order to take the banknote from the conveyance path 12*a* to each cassette.

The cassette B1 and the cassette B2 are storages for storing 5000 yen bills (hereinafter, it may be simply described as "5000 yen"). In addition, at the entrance of each cassette, the gate portion for switching the conveyance pathway is installed in order to take the banknote from the conveyance path 12*a* to each cassette.

The cassette C1 and the cassette C2 are storages for storing 1000 yen bills (hereinafter, it may be simply described as "1000 yen"). In addition, at the entrance of each cassette, the gate portion for switching the conveyance pathway is installed in order to take the banknote from the conveyance path 12*a* to each cassette.

The cassette D is a rejecting storage for storing damaged banknotes, and the gate portion for switching the conveyance pathway is installed at the entrance of the cassette in order to take the banknote from the conveyance path 12*a* to the cassette D.

The control unit 20 is a processing unit that manages the entire banknote handling apparatus 10, and is, for example, a processor such as a central processing unit (CPU) or an information processing apparatus including the processor. The control unit 20 conveys each banknote stored in each temporary storage to any of corresponding cassettes. Then, the control unit 20 executes drive (switching) control of the gate portion according to the positional relationship with a forward banknote, which is a banknote conveyed earlier, so as to perform storage (conveyance) in the conveyance destination cassette. Note that the control unit 20 is communicably connected to each unit illustrated in FIG. 2.

Description of General Technology

Next, drive control of the gate portion using a general technique will be described with reference to FIGS. 3 and 4. Here, a normal banknote without a clear window and a polymer banknote with a clear window will be described as an example. In addition, in the present example, an example in which a 10,000 yen bill is conveyed to the cassette A1 will be described. Note that, in the present example, the lateral direction of a rectangular banknote will be described as the conveyance direction, but it is not limited thereto, and any change can be made.

Figure 3:
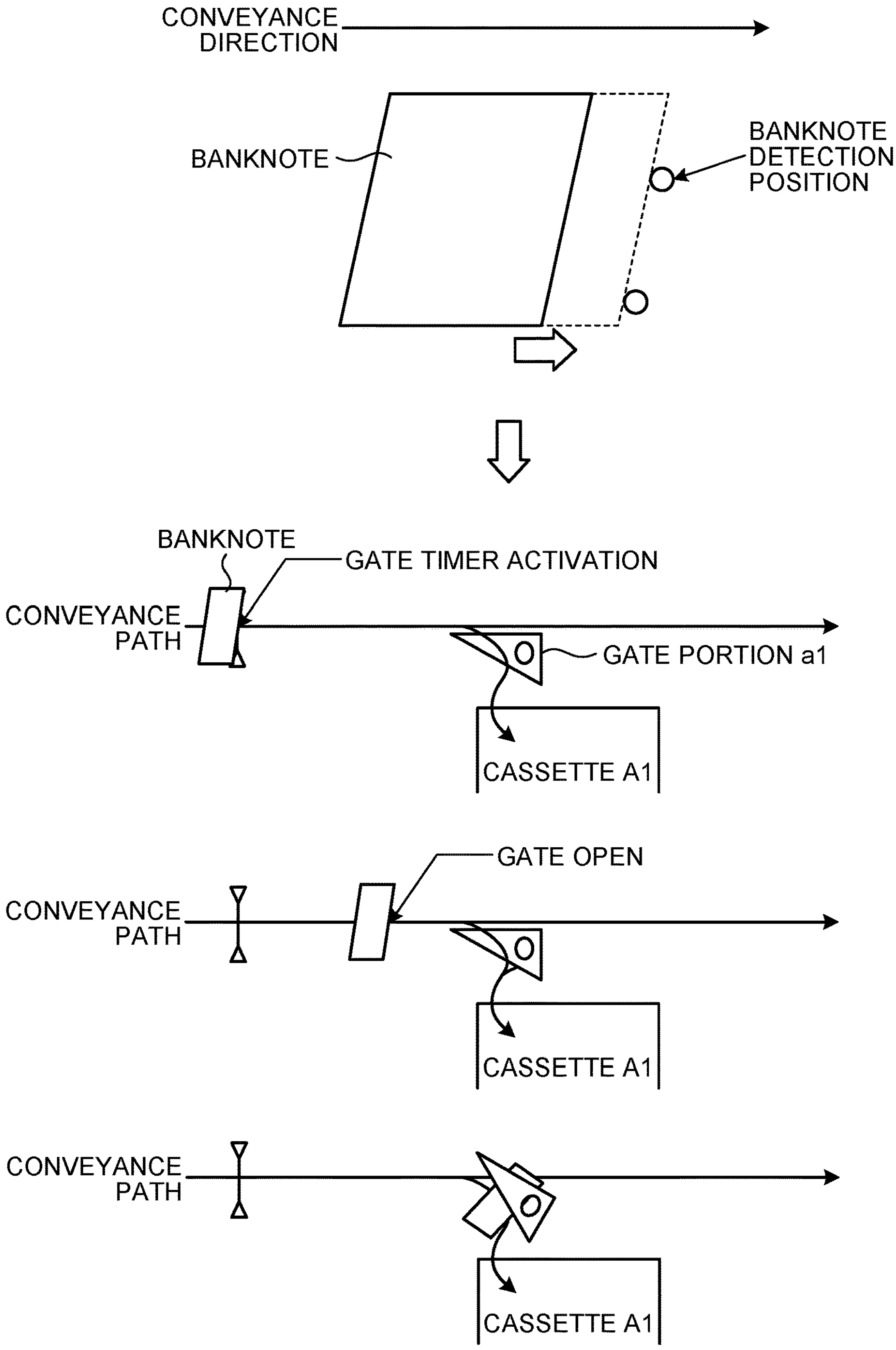
FIG. 3 is a diagram explaining driving of a general gate portion at the time of conveying a normal banknote.

FIG. 3 is a diagram explaining driving of a general gate portion at the time of conveying a normal banknote. As illustrated in FIG. 3, when a banknote to be conveyed is detected by the reference sensor 16 (see FIG. 2), the general banknote handling apparatus activates a gate timer, which is a timer for driving a gate portion a1 for switching the conveyance pathway to the cassette A1. Subsequently, when the gate timer reaches a set value, the general banknote handling apparatus drives the gate portion a1 to open the gate so as to change the conveyance direction of the banknote conveyed on the conveyance path 12*a* to the cassette A1 direction by the gate portion a1. As a result, the banknote is normally stored in the cassette A1.

Figure 4:
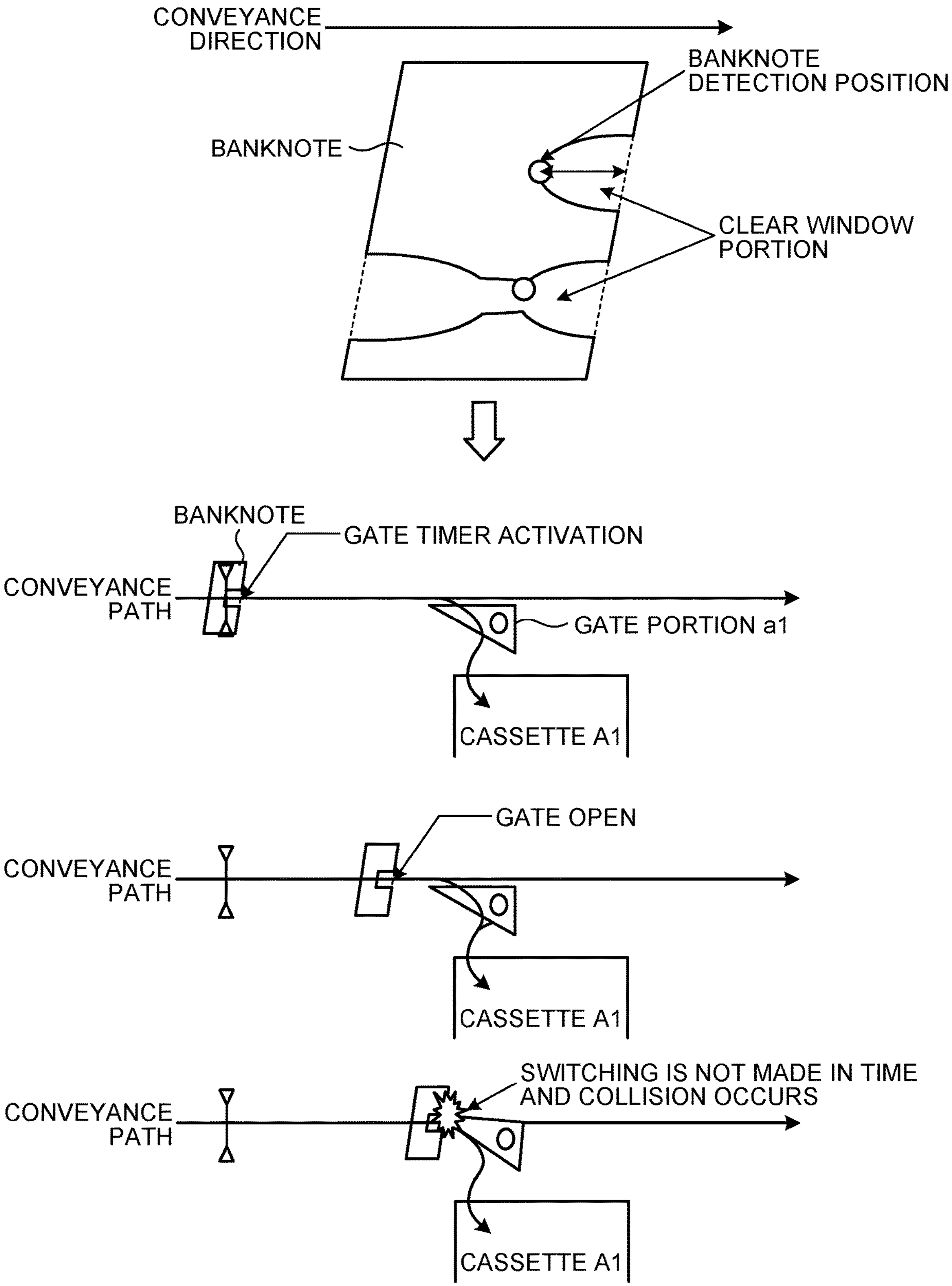
FIG. 4 is a diagram explaining a problem at the time of conveying a polymer banknote.

FIG. 4 is a diagram explaining a problem at the time of conveying a polymer banknote. As illustrated in FIG. 4, when a polymer banknote to be conveyed is detected by the reference sensor 16 (see FIG. 2), the general banknote handling apparatus activates a gate timer for driving the gate portion a1. At this time, the clear window portion of the polymer banknote is not able to be detected by the optical sensor of the reference sensor 16. For this reason, the reference sensor 16 is not capable of detecting the polymer banknote until a portion other than the clear window portion located on the inner side from the end of the polymer banknote reaches the reference sensor 16. That is, the detection time is delayed as compared with the case of the normal banknote.

Then, when the gate timer reaches a set value, the general banknote handling apparatus drives the gate portion a1 to open the gate so as to change the conveyance direction of the banknote conveyed on the conveyance path 12*a* to the cassette A1 direction by the gate portion a1. However, since the detection time of the polymer banknote is delayed, the start of activation of the gate timer is also later than that in the case of the normal banknote. For this reason, there is a possibility that, before the polymer banknote reaches the gate portion a1 that returns to the original state (closed state) each time the banknote passes, the driving of the gate portion a1 is not in time and the polymer banknote collides with the gate portion a1 and is not stored normally.

Therefore, the control unit 20 of the banknote handling apparatus 10 according to the first example holds a normal interval between conveyed banknotes in advance. Then, the control unit 20 calculates a difference between the timing at which the banknote to be conveyed is detected and the normal interval, and corrects the timing of driving the gate portion on the basis of the difference, thereby reducing the risk of collision. Therefore, even when the gate portion returns to the original state (closed state) each time the passage of the banknote is completed, the risk of collision can be reduced.

Functional Configuration

Next, a functional configuration of the banknote handling apparatus 10 will be described with reference to FIG. 5. Note that the host server 1 can adopt, for example, a configuration similar to that of a server apparatus installed in a host center of a financial institution such as a bank that owns and manages each automatic cash deposit/payment apparatus, and thus detailed description thereof will be omitted.

Figures 5, 6:
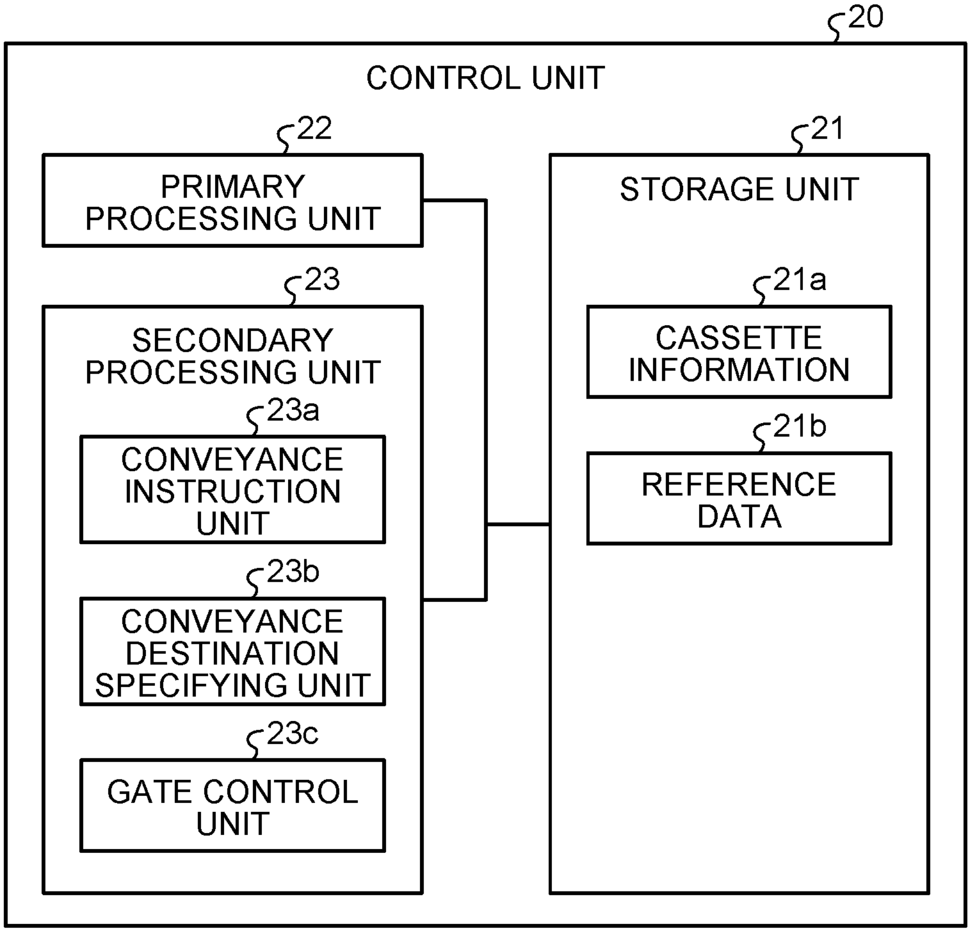
FIG. 5 is a functional block diagram illustrating a functional configuration of a control unit according to a first example.
FIG. 6 is a diagram illustrating an example of cassette information.

FIG. 5 is a functional block diagram illustrating a functional configuration of the control unit 20 according to the first example. As illustrated in FIG. 5, the control unit 20 of the banknote handling apparatus 10 includes a storage unit 21, a primary processing unit 22, and a secondary processing unit 23. In addition, the primary processing unit 22 and the secondary processing unit 23 are an example of an electronic circuit included in the processor and an example of a process executed by the processor. Note that, in FIG. 5, only the control unit 20 included in the banknote handling apparatus 10 is illustrated in order to simplify the description.

The storage unit 21 is an example of a storage apparatus such as internal memory included in the processor, and stores cassette information 21*a* and reference data 21*b*.

The cassette information 21*a* is information regarding the cassette of each banknote handling apparatus 10. Specifically, the cassette information 21*a* is the cassette included in each banknote handling apparatus 10, a storage target of each cassette, or the like. FIG. 6 is a diagram illustrating an example of the cassette information 21*a*. As illustrated in FIG. 6, the cassette information 21*a* is information in which "banknote" and "cassette" are associated.

The "banknote" set here is information for specifying the type of the banknote, and the "cassette" is information for specifying the storage destination cassette. In the example of FIG. 6, in the banknote handling apparatus 10 of the automatic cash deposit/payment apparatus X, it is set that the cassette A1 and the cassette A2 are cassettes for 10,000 yen bills, the cassette B1 and the cassette B2 are cassettes for 5000 yen bills, the cassette C1 and the cassette C2 are cassettes for 1000 yen bills, and the cassette D is a cassette for another banknote.

The reference data 21*b* is various types of setting information regarding the conveyance of the banknote in the banknote handling apparatus 10. FIG. 7 is a diagram illustrating an example of the reference data 21*b*. As illustrated in FIG. 7, the reference data 21*b* is information in which "banknote size (mm), conveyance speed (mm/sec), counting speed (sheet/sec), arrival time of next banknote (msec), time taken to pass through sensor (msec), banknote interval (msec), and drive start time of gate portion (msec)" are associated.

The "banknote size (mm)" set here indicates the size of a banknote to be conveyed, the "conveyance speed (mm/sec)" indicates the speed at which the banknote is conveyed in the banknote handling apparatus 10, and the "counting speed (sheet/sec)" indicates the number of banknotes to be conveyed in 1 sec. The "gate portion drive start time (msec)" indicates a drive start time from when the banknote to be conveyed is detected by the reference sensor 16 to when the gate portion is driven.

Figure 8:
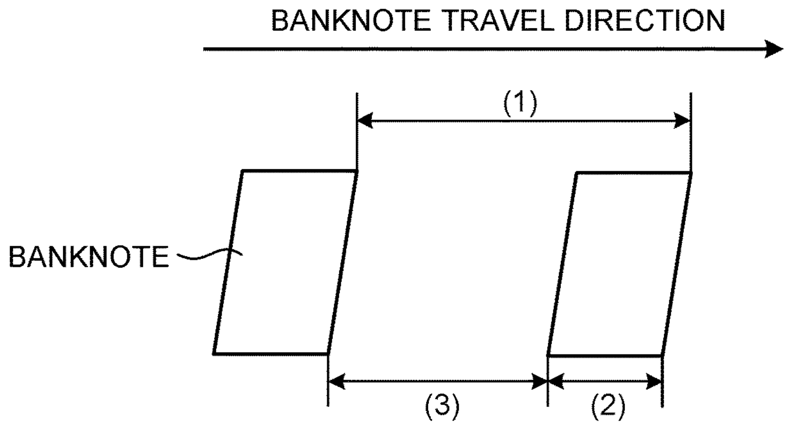
FIG. 8 is a diagram explaining an example of calculation of reference data.

In addition, the "arrival time of next banknote (msec), the time taken to pass through sensor (msec), and the banknote interval (msec)" will be described with reference to FIG. 8. FIG. 8 is a diagram explaining an example of calculation of the reference data. The "arrival time of next banknote (msec)" is the time illustrated in (1) of FIG. 8, and indicates the time from when the head of a forward banknote passes through the reference sensor 16 until the head of a next banknote is detected by the reference sensor 16.

In addition, the "time taken to pass through sensor (msec)" is the time illustrated in (2) of FIG. 8, and indicates the time needed for the width (lateral length) of the banknote, which is the conveyance direction, to pass through the sensor such as the reference sensor 16. The "banknote interval (msec)" is the time illustrated in (3) of FIG. 8, and indicates the banknote interval (conveyance interval) that is the time when the forward banknote passes through the reference sensor 16 until the head of a next banknote is detected by the reference sensor 16. That is, the "arrival time of next banknote (msec)" in (1) coincides with the time obtained by adding the "time taken to pass through sensor (msec)" in (2) to the "banknote interval (msec)" in (3).

The example of FIG. 7 indicates that, in a case where a banknote of 75 mm is conveyed at a conveyance speed of 1200 (mm/sec), eight sheets of banknote can be conveyed in 1 sec, arrival time of the next banknote is 125 msec, the time for one sheet of banknote to pass through the sensor is 62 msec, and the banknote interval is 63 msec, and it is set to drive the gate portion after 200 msec has elapsed since the detection by the reference sensor 16. Note that, in the present example, an example in which a banknote of 75 mm is conveyed at a conveyance speed of 1200 (mm/sec) will be described.

The primary processing unit 22 is a processing unit that executes the primary deposit command received from the host server 1 and executes the distinguishing and the primary storage of each deposited banknote. For example, when receiving the primary deposit command from the host server 1 that has detected that the deposit has been made to the deposit/withdrawal unit 11, the primary processing unit 22 executes the primary deposit command. By executing the primary deposit command, the primary processing unit 22 inputs the banknotes deposited in the deposit/withdrawal unit 11 one by one into the conveyance path 12*a*, and causes the distinguishing unit 13 to execute distinguishing.

Then, on the basis of the result of distinguishing by the distinguishing unit 13, the primary processing unit 22 stores a normal banknote in the temporary storage 14, and stores an abnormal banknote (damaged banknote) in the damaged banknote temporary storage 15. In addition, the primary processing unit 22 receives a detection signal from the passage sensor 17*a* or 17*b* installed at the entrances of the distinguishing unit 13 and the temporary storages, thereby specifying the order of the conveyed banknotes and the status of the primary storage.

The secondary processing unit 23 is a processing unit that includes a conveyance instruction unit 23*a*, a conveyance destination specifying unit 23*b*, and a gate control unit 23*c*, and executes secondary deposit processing of conveying each banknote from each temporary storage to an appropriate cassette and storing each banknote in each cassette. For example, the secondary processing unit 23 executes the secondary deposit processing when temporary deposit processing of temporarily storing each deposited banknote in each temporary storage is completed or when a secondary deposit command instructing execution of the secondary deposit processing is received from the host server 1.

The conveyance instruction unit 23*a* is a processing unit that instructs conveyance from each temporary storage to the cassette. For example, when a signal indicating that the banknote storage is completed is received from each cassette, the conveyance instruction unit 23*a* acquires a next banknote from the temporary storage 14 and inputs the next banknote to the conveyance path 12*a*.

The conveyance destination specifying unit 23*b* is a processing unit that specifies a cassette to be a conveyance destination of the banknote input to the conveyance path 12*a* by the conveyance instruction unit 23*a*. Specifically, when the banknote put in the conveyance path 12*a* passes through the distinguishing unit 13, the conveyance destination specifying unit 23*b* acquires the result of distinguishing from the distinguishing unit 13. Then, the conveyance destination specifying unit 23*b* specifies the cassette from the cassette information 21*a* on the basis of the result of distinguishing.

For example, when acquiring 10,000 yen as the result of distinguishing from the distinguishing unit 13, the conveyance destination specifying unit 23*b* specifies the conveyance destination as the cassette A1 or the cassette A2 according to the cassette information 21*a*. Note that the cassette A1 is preferentially selected as a conveyance destination, and the cassette A2 is selected when the number of storages of the cassette A1 exceeds the upper limit value.

The gate control unit 23*c* is a processing unit that executes drive control of the gate portion corresponding to the cassette specified by the conveyance destination specifying unit 23*b* on the basis of the positional relationship between the banknote to be conveyed and the forward banknote. Specifically, the gate control unit 23*c* receives a detection signal from the reference sensor 16. Then, the gate control unit 23*c* calculates the time from when the detection signal for the forward banknote with respect to the banknote to be conveyed is received to when the detection signal for the banknote to be conveyed is received. Then, the gate control unit 23*c* calculates a difference between the time and the reference data 21*b*, and drives the gate portion earlier by the difference.

Figure 9:
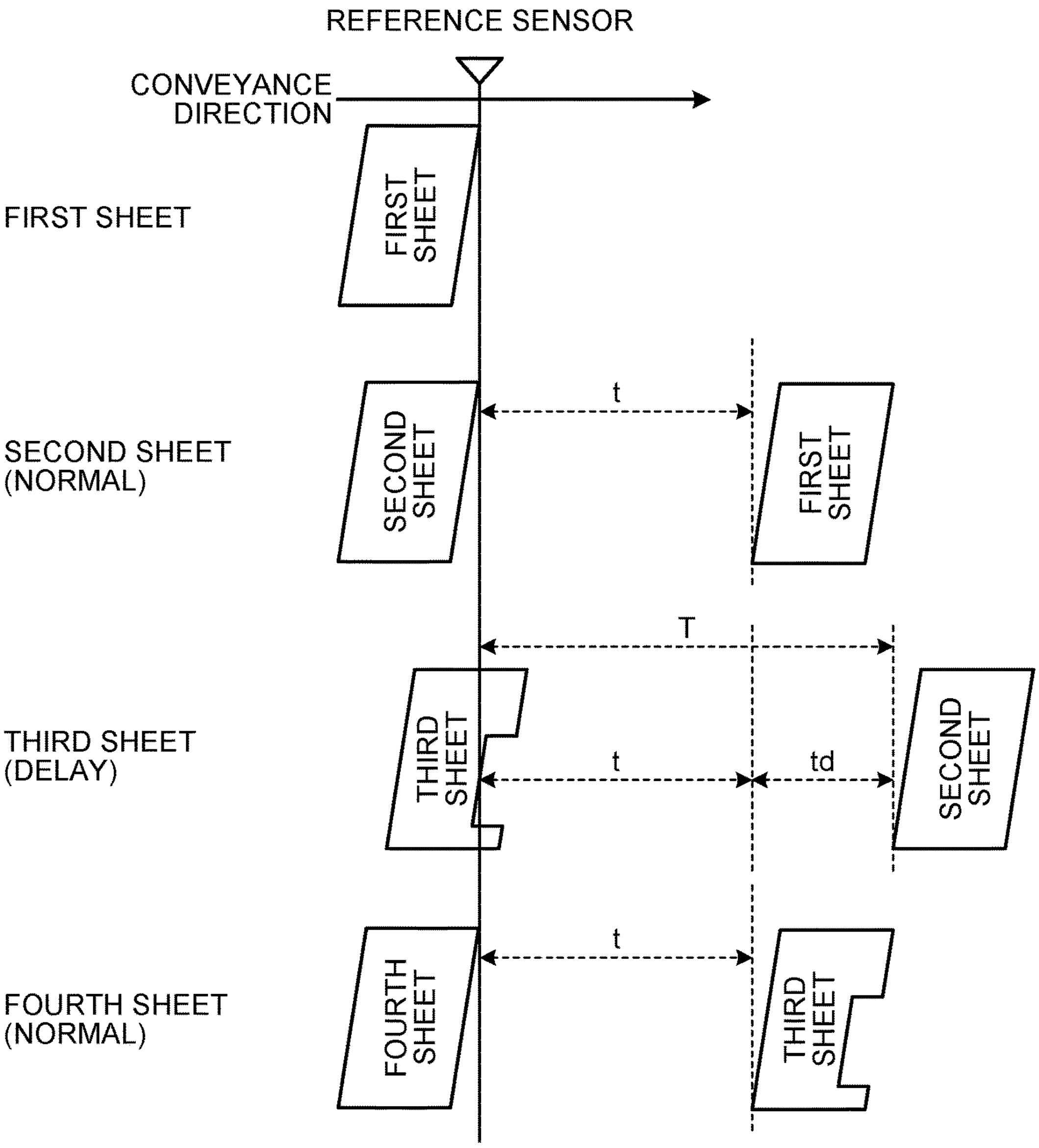
FIG. 9 is a diagram explaining drive control of a gate portion.

FIG. 9 is a diagram explaining drive control of the gate portion. Here, as an example, storage in the cassette A1, driving of the gate portion a1, and the gate portion drive start time will be described as 200 (msec). As illustrated in FIG. 9, when the first sheet of normal banknote is detected by the reference sensor 16, the gate control unit 23*c* drives the gate portion a1 200 (msec) after the timing of detection, and stores the first sheet of normal banknote in the cassette A1.

Subsequently, when the second sheet of normal banknote is detected by the reference sensor 16, the gate control unit 23*c* calculates t (msec) as the banknote interval from the first sheet. Then, the gate control unit 23*c* determines that t (msec) coincides with the banknote interval "63 (msec)" of the reference data 21*b*. As a result, the gate control unit 23*c* drives the gate portion a1 200 (msec) after the timing of detection by the reference sensor 16, and stores the second sheet of normal banknote in the cassette A1.

Subsequently, when the third sheet of polymer banknote is detected by the reference sensor 16, the gate control unit 23*c* calculates T (msec) as the banknote interval from the second sheet. Then, since T (msec) does not coincide with the banknote interval "63 (msec)" of the reference data 21*b*, the gate control unit 23*c* calculates td (msec) as a difference between T (msec) and 63 (msec). As a result, the gate control unit 23*c* drives the gate portion a1 at a timing earlier by td (msec) than 200 (msec), which is the set value, and stores the third sheet of polymer banknote in the cassette A1. That is, the gate control unit 23*c* changes the gate timer for driving the gate portion a1 from "200 (msec)" to "200-td (msec)".

Subsequently, when the fourth sheet of normal banknote is detected by the reference sensor 16, the gate control unit 23*c* calculates t (msec) as the banknote interval from the third sheet. Then, the gate control unit 23*c* determines that t (msec) coincides with the banknote interval "63 (msec)" of the reference data 21*b*. As a result, the gate control unit 23*c* drives the gate portion a1 200 (msec) after the timing of detection by the reference sensor 16, and stores the fourth sheet of normal banknote in the cassette A1.

As described above, the gate control unit 23*c* drives the gate portion as set while the banknote is conveyed according to the reference data 21*b*, and corrects the timing of driving the gate portion only when the banknote interval is different from the reference data 21*b*.

Figure 10:
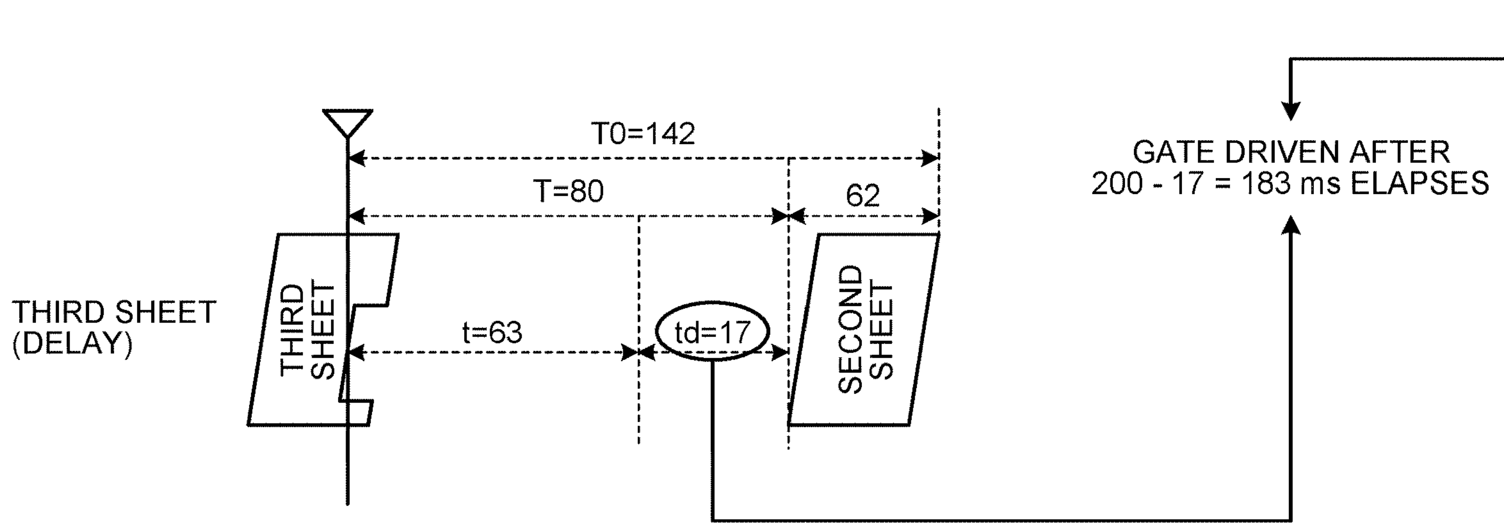
FIG. 10 is a diagram explaining correction of driving time of a gate portion.

Next, correction of driving time of the gate portion will be specifically described. FIG. 10 is a diagram explaining correction of driving time of the gate portion. As illustrated in FIG. 10, the gate control unit 23*c* acquires bill interval data "T0=142 (msec)", which is the time from the detection of the second sheet of normal banknote to the detection of the third sheet of polymer banknote by the reference sensor 16. Subsequently, the gate control unit 23*c* acquires "time taken to pass through sensor (msec)=62" from the reference data 21*b*, and calculates "T=142−62=80" as the banknote interval.

Then, the gate control unit 23*c* acquires "banknote interval (msec)=63" from the reference data 21*b*, and calculates "80−63=17 (msec)" as the difference between a current banknote interval T and the banknote interval of the set value. Then, the gate control unit 23*c* acquires "gate portion drive start time (msec)=200" from the reference data 21*b*, and changes the "gate portion drive start time (msec)" to "183 (=200-17)" since the third sheet of polymer banknote is detected "17 (msec)" later than the normal banknote. As a result, the gate portion a1 starts driving earlier by "17 (msec)" than usual.

Flow of Processing

Figure 11:
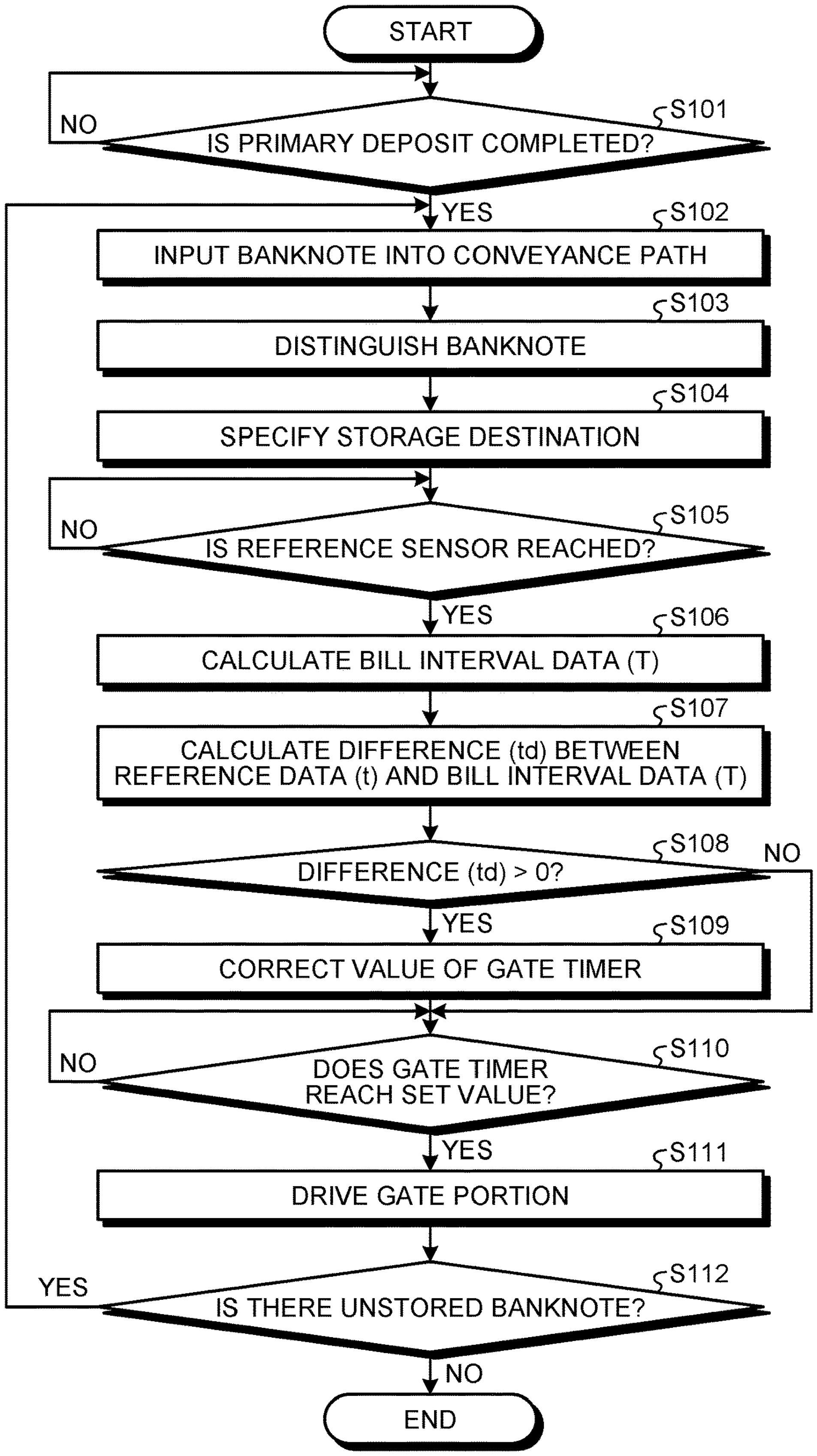
FIG. 11 is a flowchart illustrating a flow of driving processing of the gate portion according to the first example.

FIG. 11 is a flowchart illustrating a flow of driving processing of the gate portion according to the first example. As illustrated in FIG. 11, when the primary deposit processing is completed (S101: Yes), the secondary processing unit 23 takes out the banknote from the temporary storage 14 and inputs the banknote to the conveyance path 12*a* (S102).

Subsequently, the secondary processing unit 23 acquires the result of distinguishing of the banknote from the distinguishing unit 13 (S103), and specifies the storage destination (conveyance destination) on the basis of the result of distinguishing (S104). Then, when the banknote to be conveyed reaches the reference sensor 16 (S105: Yes), the secondary processing unit 23 calculates the bill interval data (T: banknote interval), which is a distance from the forward banknote (S106).

Then, the secondary processing unit 23 calculates a difference between the reference data and the bill interval data (S107), and determines whether or not the difference is larger than 0 (S108). Here, when the difference is larger than 0 (S108: Yes), the secondary processing unit 23 corrects the value of the gate timer by the difference (S109). On the other hand, when the difference is 0 or less (S108: No), the secondary processing unit 23 does not correct the value of the gate timer.

Then, when the gate timer reaches the set value (S110: Yes), the secondary processing unit 23 drives the gate portion corresponding to the storage destination cassette (S111). Then, when there is an unstored banknote (S112: Yes), the secondary processing unit 23 executes S102 and the subsequent steps for the next banknote. On the other hand, when there is no unstored banknote (S112: No), the secondary processing unit 23 ends the processing.

Figure 12:
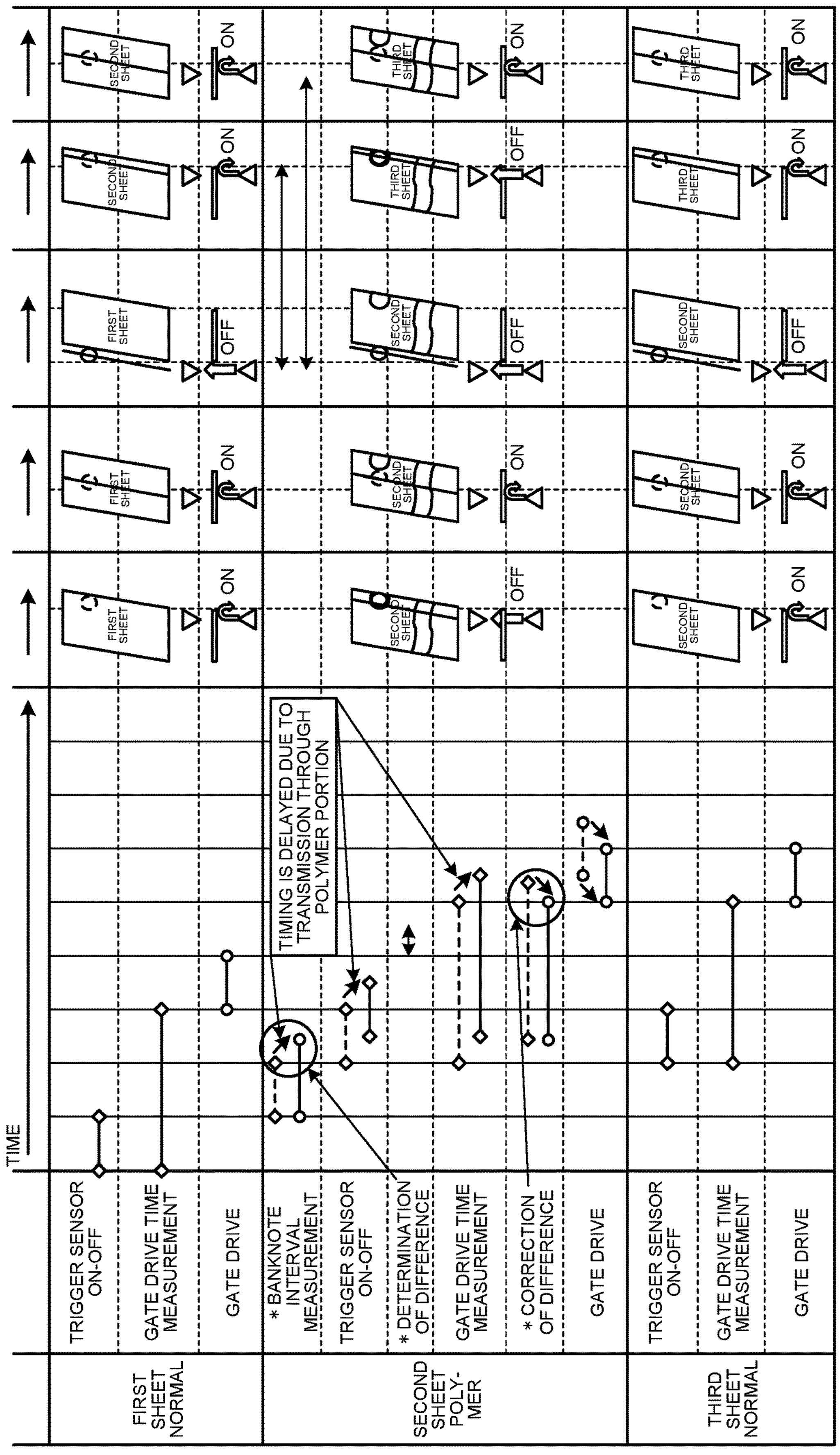
FIG. 12 is a diagram explaining opening/closing timing of the gate portion according to the first example.

FIG. 12 is a diagram explaining opening/closing timing of the gate portion according to the first example. As illustrated in FIG. 12, when the first sheet of normal banknote is detected by the reference sensor 16, the secondary processing unit 23 turns on the trigger and maintains the trigger on while the banknote is detected. Then, the secondary processing unit 23 activates the gate timer at the timing when the trigger is turned on, and starts the measurement of the driving time of the gate. Then, the secondary processing unit 23 drives the gate portion when the gate timer reaches a normal set value "banknote interval (msec)".

Subsequently, when the second sheet of polymer banknote is detected by the reference sensor 16, the secondary processing unit 23 turns on the trigger and maintains the trigger on while the banknote is detected. Here, the secondary processing unit 23 measures the banknote interval and determines a difference from the normal time. Then, the secondary processing unit 23 activates the gate timer at the timing when the trigger is turned on, but corrects the timer value so as to be shortened by the difference, and starts the measurement of the driving time of the gate. Then, the secondary processing unit 23 drives the gate portion when the gate timer reaches a corrected normal value. Note that since the third sheet is the same as the first sheet, detailed description thereof will be omitted.

Effects

As described above, in a case where the interval between banknotes is wide, the banknote handling apparatus 10 dynamically changes the timing of driving the gate portion according to the situation, and thus, it is possible to reduce misallocation of the conveyance route and the risk of collision with the gate portion. In addition, in a case where the interval between banknotes is narrow, the banknote handling apparatus 10 invalidates the correction processing described above, so that it is possible to reduce the misallocation without changing the conveyance route allocation performance.

Second Example

By the way, in the first example, the example in which the timing of driving the gate portion is corrected on the basis of the banknote interval distance has been described, but, in a case where the banknote is first conveyed to the storage destination cassette, such as a leading banknote or a banknote stored in a cassette different from that of the forward banknote, the gate portion can be more effectively driven.

Figure 13:
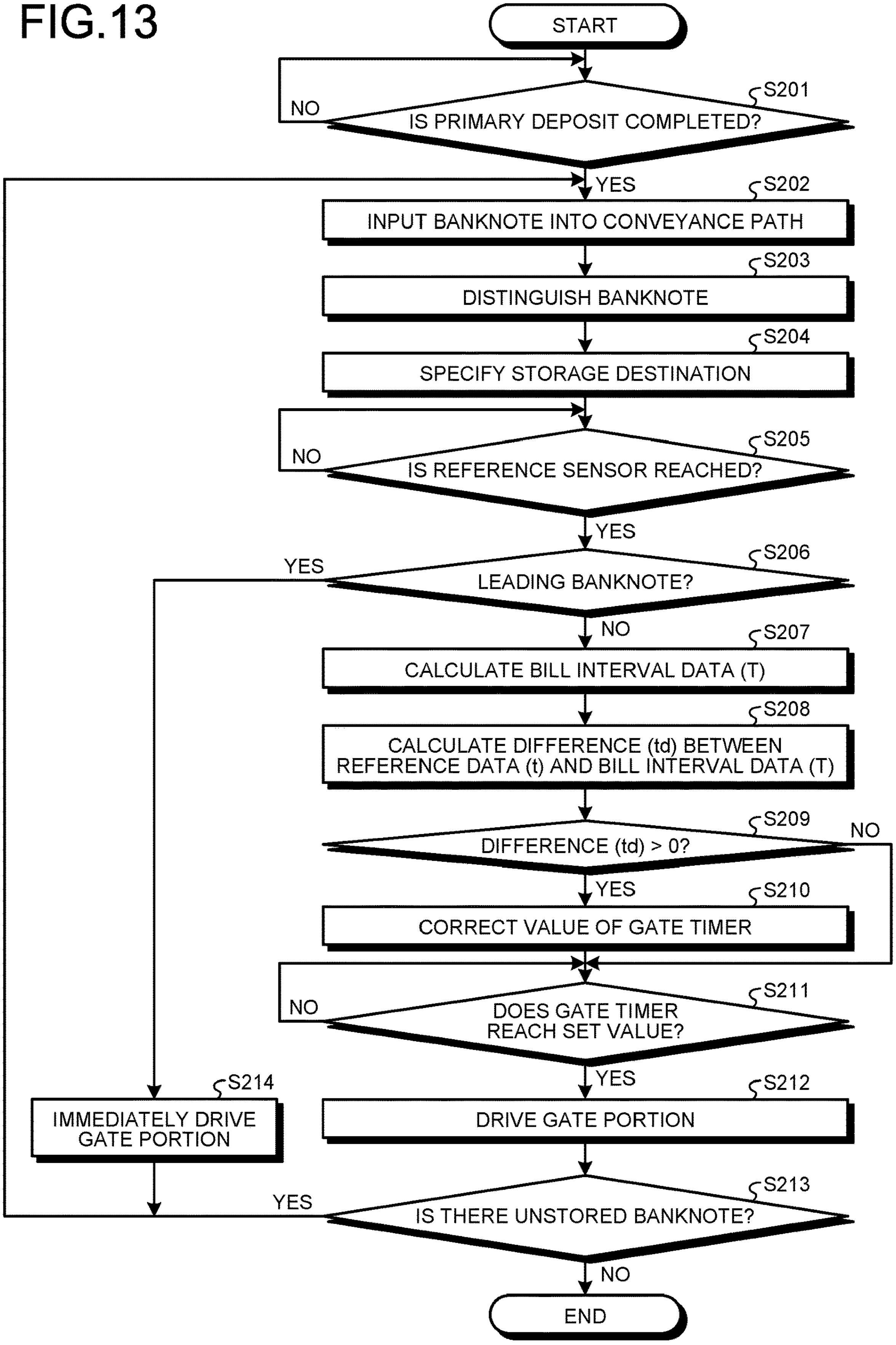
FIG. 13 is a flowchart illustrating a flow of driving processing of a gate portion according to a second example.

FIG. 13 is a flowchart illustrating a flow of driving processing of the gate portion according to the second example. As illustrated in FIG. 13, when the primary deposit processing is completed (S201: Yes), the secondary processing unit 23 takes out the banknote from the temporary storage 14 and inputs the banknote to the conveyance path 12*a* (S202).

Subsequently, the secondary processing unit 23 acquires the result of distinguishing of the banknote from the distinguishing unit 13 (S203), and specifies the storage destination (conveyance destination) on the basis of the result of distinguishing (S204). Then, when the banknote to be conveyed reaches the reference sensor 16 (S205: Yes), the secondary processing unit 23 determines whether or not the banknote to be conveyed is the leading banknote (S206).

Here, when the banknote to be conveyed is the leading banknote (S206: Yes), the secondary processing unit 23 immediately drives the gate portion corresponding to the conveyance destination cassette (S214). Then, S202 and the subsequent steps are executed for the next banknote.

Note that the processing from S207 to S213 executed in a case where the banknote to be conveyed is not the leading banknote is similar to the processing from S106 to S112 described in FIG. 11, and thus detailed description thereof will be omitted.

As described above, the banknote handling apparatus 10 can immediately drive the gate portion of the storage destination cassette when the leading banknote having no forward banknote is detected by the reference sensor 16. As a result, the banknote handling apparatus 10 can unfailingly reduce the risk of collision with the gate portion as compared with the first example.

Note that the leading banknote is not limited to the banknote that is input to the conveyance path 12*a* first after the secondary deposit, and for example, a banknote to be stored in a cassette different from that of the forward banknote can be similarly processed. In addition, the timing of determining whether or not it is a leading banknote can be arbitrarily changed.

Third Example

By the way, in the first example, the example in which the timing of driving the gate portion is corrected on the basis of the banknote interval distance has been described, but, depending on the correction, the forward banknote may be passing through the gate portion. Therefore, in the third example, an example in which the storage destination is dynamically changed when the forward banknote is passing through the gate portion will be described.

Figure 14:
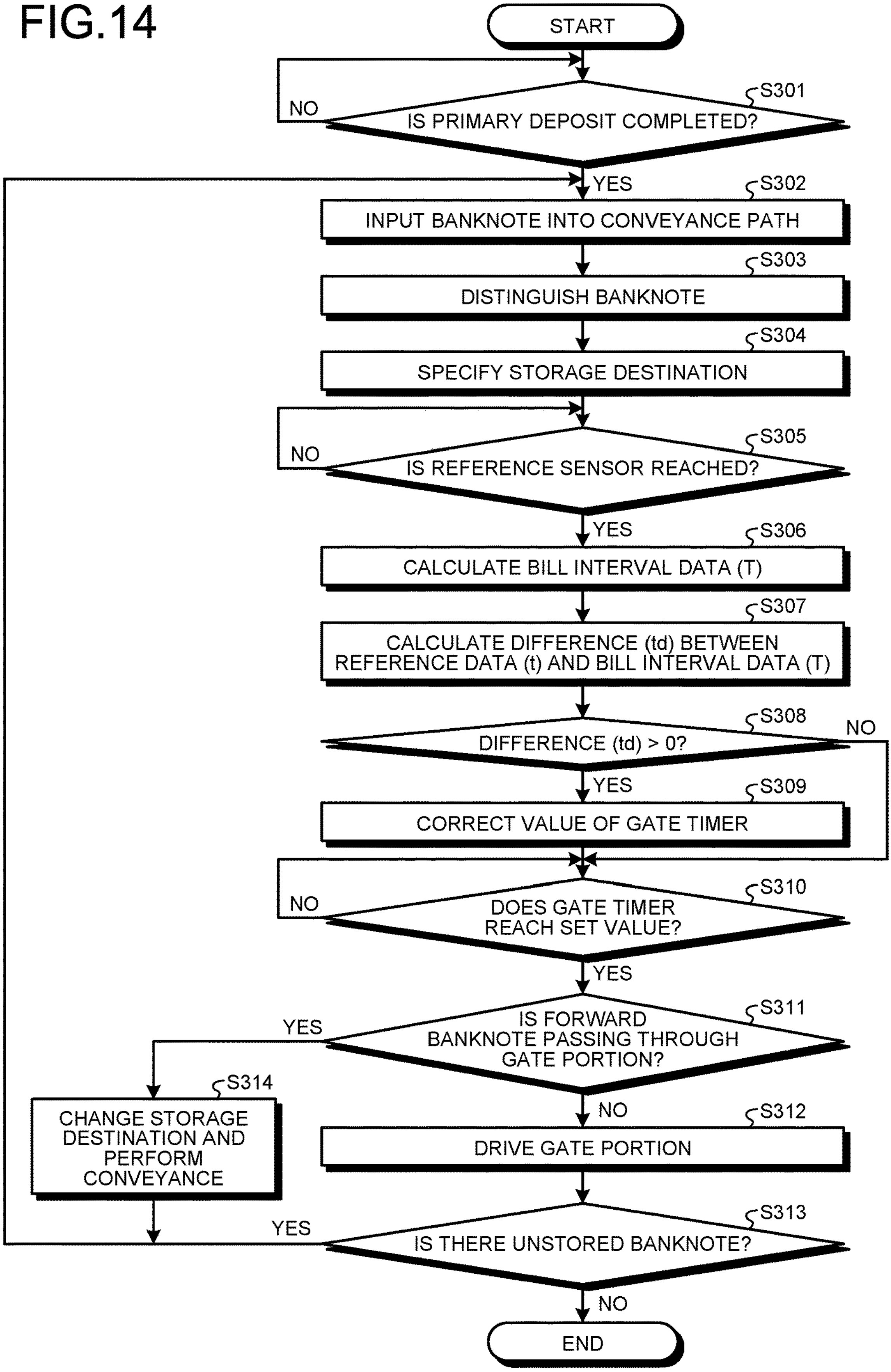
FIG. 14 is a flowchart illustrating a flow of driving processing of a gate portion according to a third example.

FIG. 14 is a flowchart illustrating a flow of driving processing of the gate portion according to the third example. Since the processing from S301 to S310 illustrated in FIG. 14 is similar to the processing from S101 to S110 in FIG. 11, detailed description is omitted.

Then, when the gate timer reaches the set value (S310: Yes), the secondary processing unit 23 determines whether or not the forward banknote is passing through the gate portion (S311). For example, in the case of clockwise conveyance and the cassette A1 being the storage destination, the secondary processing unit 23 determines whether or not the forward banknote has passed through the passage sensor 17*m* according to whether or not the detection signal from the passage sensor 17*m* can be received. Then, the secondary processing unit 23 determines that the forward banknote has passed through the gate portion a1 when the detection signal has been received from the passage sensor 17*m*, and determines that the forward banknote is passing through the gate portion a1 when the detection signal has not been received from the passage sensor 17*m*.

Here, when it is determined that the forward banknote is passing through the gate portion (S311: Yes), the secondary processing unit 23 changes the storage destination and conveys the corresponding banknote (S314). For example, when the forward banknote is conveyed to the cassette A1, the secondary processing unit 23 changes the storage destination (conveyance destination) to the other cassette A2 that stores the same type of banknote.

Note that the processing of S312 and the subsequent steps is similar to the processing of S111 and the subsequent steps described with reference to FIG. 11, and thus detailed description thereof will be omitted.

As described above, since the banknote handling apparatus 10 can switch the storage destination according to the conveyance situation of the forward banknote, it is possible to avoid the risk of collision with the gate portion even when the banknote to be conveyed is conveyed earlier (at short intervals) than usual for some reason.

Note that various methods can be adopted to determine whether or not the forward banknote is passing through the gate portion. For example, the distance to the gate portion and the conveyance speed are used to calculate and hold the time (passing time) until passing through the reference sensor 16 and reaches the gate portion. Then, when controlling the gate portion for the banknote to be conveyed, the secondary processing unit 23 can determine that the forward banknote is passing through the gate portion in a case where the passing time has elapsed or in a case where the gate drive timing coincides with the elapsed time by correcting the drive time. In addition, the timing of determining whether or not the forward banknote is passing through the gate portion can be arbitrarily changed.

Fourth Example

Although the examples of the present invention have been described, the present invention may be implemented in various different forms other than the above-described examples.

Numerical Value, Threshold Value, and the Like

In addition, the various numerical values, the threshold values, the number of cassettes, the banknote types, the number of banknotes, the reference data, and the like used in the examples described above are merely examples, and can be arbitrarily changed. In addition, in the examples described above, for example, the polymer banknote subjected to the polymer treatment having a clear window has been described as an example, but it is not limited thereto, and a damaged banknote and a banknote having a direction different from the normal direction can be similarly processed. That is, the processing described in the examples is not limited by the type of the banknote and the like, and is effective when the banknote to be conveyed is detected at an interval different from a normal interval even if the cause is unknown.

System

The processing procedure, the control procedure, the specific names, and the information including various data and parameters described in the document and the drawings described above can be arbitrarily changed unless otherwise specified. In addition, the specific examples, numerical values, and the like described in the examples are merely examples, and can be arbitrarily changed.

In addition, the components of each apparatus illustrated in the drawings are functionally conceptual, and are not necessarily physically configured as illustrated in the drawings. That is, specific forms of distribution and integration of the apparatuses are not limited to those illustrated in the drawings. That is, all or a part thereof can be functionally or physically distributed and integrated in an arbitrary unit according to various loads, use status, and the like. Further-more, all or an arbitrary part of each processing function performed in each apparatus can be realized by a CPU and a program analyzed and executed by the CPU, or can be realized as hardware by wired logic.

According to the embodiments, occurrence of a conveyance error can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A banknote handling apparatus comprising:

a plurality of storage mechanisms that are provided for each type of paper sheet and store a corresponding paper sheet;

a distinguishing unit that distinguishes a first paper sheet input;

a reference sensor that is installed on a conveyance path between the distinguishing unit and the plurality of storage mechanisms, and detects a paper sheet conveyed on the conveyance path;

a detection unit that detects that the first paper sheet is conveyed to a corresponding storage mechanism specified according to a result of the distinguishing; and a drive control unit that:

in response to a detection of the first paper sheet by the detection unit, determines a positional relationship between the first paper sheet and a forward paper sheet conveyed earlier than the first paper sheet, based on a time elapsed from when the forward paper sheet is passed through the reference sensor to when the first paper sheet is passed through the reference sensor, and in accordance with the determined positional relationship, corrects reference data indicating timing of driving a gate portion that switches a conveyance pathway to the corresponding storage mechanism after the first paper sheet is passed through the reference sensor, and changes the timing of driving the gate portion; and immediately drives the gate portion when a conveyance of the first paper sheet is detected in a case where the corresponding storage mechanism that is a conveyance destination of an initial paper sheet after start of conveyance of the first paper sheet or the first paper sheet is different from a storage mechanism that is a conveyance destination of the forward paper sheet.

2. The banknote handling apparatus according to claim 1, wherein the drive control unit corrects a drive start time from when the conveyance of the first paper sheet is detected to when the gate portion is driven on a basis of a banknote interval from when the conveyance of the forward paper sheet is detected to when the conveyance of the first paper sheet is detected.

3. The banknote handling apparatus according to claim 2, wherein the drive control unit calculates a difference between the banknote interval and a predetermined set value, and advances the drive start time by the difference.

4. The banknote handling apparatus according to claim 3, wherein the drive control unit changes the conveyance destination of the first paper sheet and switches the conveyance pathway when a corrected drive start time obtained by advancing the drive start time of the gate portion with respect to the first paper sheet by the difference includes a time when the forward paper sheet passes through the gate portion.

5. A conveyance control method comprising:

distinguishing, by a distinguishing unit, a first paper sheet input;

detecting that the first paper sheet is conveyed to a corresponding storage mechanism specified according to a result of distinguishing among a plurality of storage mechanisms that are provided for each type of paper sheet and store a corresponding paper sheet;

in response to the detecting of the first paper sheet, determining a positional relationship between the first paper sheet and a forward paper sheet conveyed earlier than the first paper sheet, based on a time elapsed from when the forward paper sheet is passed through a reference sensor to when the first paper sheet is passed through the reference sensor, the reference sensor being installed on a conveyance path between the distinguishing unit and the plurality of storage mechanisms to detect a paper sheet conveyed on the conveyance path, and in accordance with the determined positional relationship, correcting reference data indicating timing of driving a gate portion that switches a conveyance pathway to the corresponding storage mechanism after the first paper sheet is passed through the reference sensor, and changing the timing of driving the gate portion; and immediately driving the gate portion when a conveyance of the first paper sheet is detected in a case where the corresponding storage mechanism that is a conveyance destination of an initial paper sheet after start of conveyance of the first paper sheet or the first paper sheet is different from a storage mechanism that is a conveyance destination of the forward paper sheet.

6. A non-transitory computer-readable recording medium having stored therein a conveyance control program that causes a computer to execute a process comprising:

distinguishing, by a distinguishing unit, a first paper sheet input;

detecting that the first paper sheet is conveyed to a corresponding storage mechanism specified according to a result of distinguishing among a plurality of storage mechanisms that are provided for each type of paper sheet and store a corresponding paper sheet;

in response to the detecting of the first paper sheet, determining a positional relationship between the first paper sheet and a forward paper sheet conveyed earlier than the first paper sheet, based on a time elapsed from when the forward paper sheet is passed through a reference sensor to when the first paper sheet is passed through the reference sensor, the reference sensor being installed on a conveyance path between the distinguishing unit and the plurality of storage mechanisms to detect a paper sheet conveyed on the conveyance path, and in accordance with the determined positional relationship, correcting reference data indicating timing of driving a gate portion that switches a conveyance pathway to the corresponding storage mechanism after the first paper sheet is passed through the reference sensor, and changing the timing of driving the gate portion; and immediately driving the gate portion when a conveyance of the first paper sheet is detected in a case where the corresponding storage mechanism that is a conveyance destination of an initial paper sheet after start of conveyance of the first paper sheet or the first paper sheet is different from a storage mechanism that is a conveyance destination of the forward paper sheet.

* * * * *